United States Patent

[11] 3,588,613

| [72] | Inventor | Jerry E. Losey<br>Fort Thomas, Ky. |
|---|---|---|
| [21] | Appl. No. | 815,892 |
| [22] | Filed | Apr. 14, 1969 |
| [45] | Patented | June 28, 1971 |
| [73] | Assignee | Cincinnati Milacron Inc.<br>Cincinnati, Ohio |

[54] METHOD AND APPARATUS FOR CONTROLLING ELECTRICAL DISCHARGE MACHINING POWER SUPPLY
10 Claims, 3 Drawing Figs.

| [52] | U.S. Cl. | 317/33, 219/69 |
|---|---|---|
| [51] | Int. Cl. | H02h 7/12 |
| [50] | Field of Search | 317/33, 51; 219/505, 69 |

[56] References Cited
UNITED STATES PATENTS

| 3,217,207 | 11/1965 | Webb | 317/51 |
|---|---|---|---|
| 3,376,478 | 4/1968 | Sheng et al. | 317/31 |

Primary Examiner—William M. Shoop, Jr.
Assistant Examiner—Harry E. Moose, Jr.
Attorney—Frank C. Leach, Jr.

ABSTRACT: When one of the output transistors of a power supply for an electrical discharge machining (EDM) apparatus shorts, the power source for the transistors is inactivated by a detection circuit. A control, which turns the output transistors on and off, also is turned off when one of the output transistors shorts to prevent any further pulses to the transistors which are not shorted. The detection circuit also may include means to short the power source before the power source is inactivated.

3,588,613

INVENTOR
JERRY E. LOSEY
BY Frank C. Leach jr.
ATTORNEY

METHOD AND APPARATUS FOR CONTROLLING ELECTRICAL DISCHARGE MACHINING POWER SUPPLY

In an EDM apparatus, the power supply must supply pulses to the tool electrode to produce spark discharges across the gap between the tool electrode and the workpiece. These spark discharges must occur so that there is no damage to the tool and/or the workpiece.

To produce the pulses across the gap, the EDM power supply may include a plurality of parallel connected output transistors, which are turned on and off by a suitable control such as a multivibrator, for example. However, if one of the output transistors shorts, an arc is produced between the tool electrode and the workpiece due to the continuous current flow through the shorted transistor. This results in damage to the tool electrode and/or the workpiece.

When the next pulse arrives from the control, the output transistors, which are not shorted, are turned on to increase the damage to the tool and/or the workpiece since the current flowing through the gap increases. This increases the damage to the tool electrode and/or the workpiece.

In the presently available control systems for detecting that a short circuit exists in one of the output transistors of an EDM power supply, a number of cycles of the machining frequency occurs before existence of the shorted transistor is recognized. Additional time is then required to deenergize the main contactor, which is controlled by a relay, in the DC power source to remove the power. This substantially long period of time, which required many milliseconds, can cause considerable damage to the tool electrode and/or the workpiece.

The present invention satisfactorily solves the foregoing problems by providing a detection circuit in which the shorting of one of the output transistors is rapidly recognized after the termination of a pulse on the transistors from their drivers. With the present invention, this detection can occur within 500 nanoseconds after termination of the pulse from the drivers.

The present invention also is capable of preventing any further energization of the output transistors, which are not shorted, within the same short period of time that the recognition of the shorted transistor occurs. This substantially reduces any damage to the tool electrode and/or the workpiece.

Furthermore, the power is deenergized more quickly than in presently available detection circuits due to the quicker recognition of the shorted transistor. The present invention also contemplates the capability of removing the power from the machining gap faster by shorting the power source upon recognition of the shorted transistor by the detection circuit.

An object of this invention is to provide a control circuit for an EDM power supply.

Another object of this invention is to provide a detection circuit for interrupting the supply of power between the tool electrode and the workpiece of an EDM apparatus when an output transistor in the EDM power supply shorts.

A further object of this invention is to provide a method for interrupting the supply of power between the tool electrode and the workpiece of an EDM apparatus when an output transistor in the EDM power supply shorts.

Other objects of this invention will be readily perceived from the following description, claims, and drawings.

This invention relates to a power supply for an electrical machining apparatus that removes material from a conductive workpiece by spark discharges across a machining gap between the workpiece and a tool electrode. The power supply includes a power source with a plurality of parallel connected transistors disposed between one side of the gap and one side of the power source. Means controls the turning on and off of all the transistors to control the spark discharges across the gap. Means senses when one of the transistors shorts with means to stop supply of current to the shorted transistor when the sensing means senses that the transistor has shorted. The stopping means includes first means to inactivate the control means to stop turning on the transistors that have not been shorted when one of the transistors is shorted with the first means being effective in a time period less than that in which the control means would again turn on the transistors.

This invention also relates to a power supply for an electrical machining apparatus that removes material from a conductive workpiece by spark discharges across the machining gap between the workpiece and the tool electrode. The power supply includes a power source with at least one transistor between one side of the gap and one side of the power source. Means controls the turning on and off of the transistor to control the spark discharges across the gap with means to sense when the transistor shorts. The sensing means is effective in a time period less than that in which the control means would again turn on the transistor. Means stops the supply of current to the transistor after the sensing means senses that the transistor is shorted.

This invention further relates to a method of detecting when there is a short in one of a plurality of output transistors of a power supply for an electrical machining apparatus that removes material from a conductive workpiece by spark discharges across a machining gap between the workpiece and a tool electrode wherein a control turns a plurality of output transistors on and off to produce the spark discharges. The method comprises sensing when any one of the plurality of output transistors shorts and stopping the supply of current to the remainder of the output transistors by deenergizing the control that turns the transistors on and off. The control is deenergized before the transistors would again be turned on to produce a spark discharge across the gap.

The attached drawings illustrate a preferred embodiment of the invention, in which.

Figure 1:
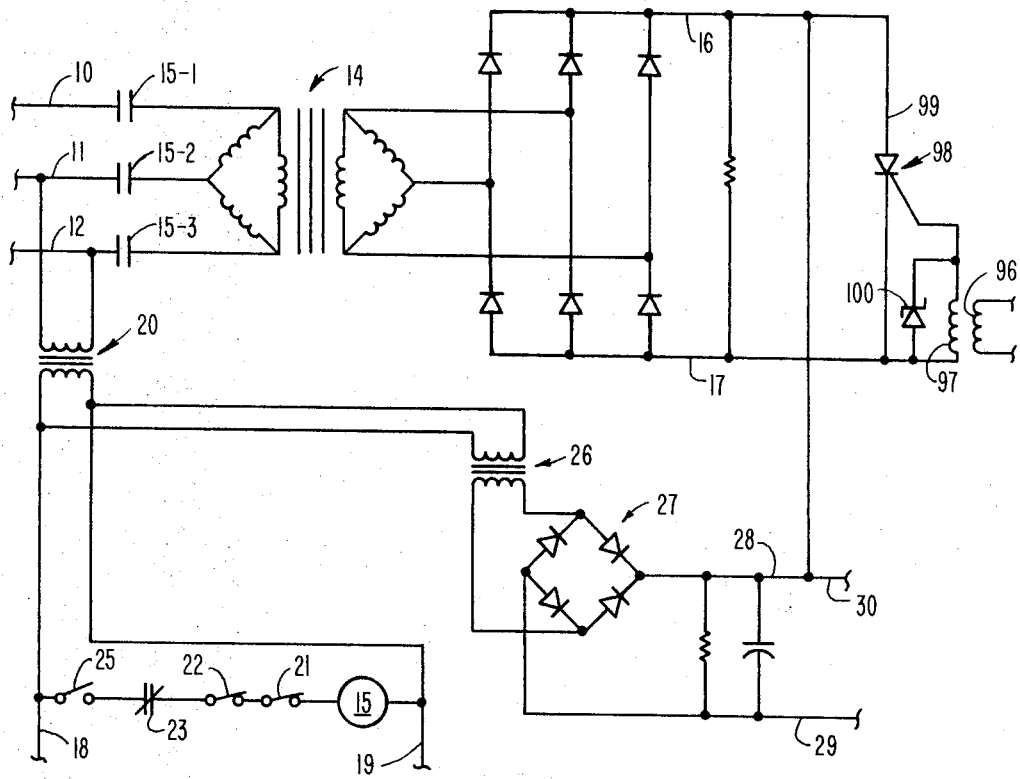
FIG. 1 is a circuit diagram of a power supply for an EDM apparatus.

Referring to the drawings and particularly FIG. 1, there is shown a power supply having lines 10—12 connected to a main power supply. The lines 10—12 are connected to one side of a transformer 14 through normally open contacts 15-1, 15-2, and 15-3 of a relay 15. By the use of rectifiers connected to the secondary windings of the transformer 14, a positive DC power supply of 80 volts is applied between lines 16 and 17 and is used as the DC power supply for the circuit of FIG. 2.

The 80 volts can appear across the lines 16 and 17 only when the normally open contacts 15-1, 15-2, and 15-3 of the relay 15 are closed. This occurs only when the relay 15 is energized.

The relay 15 is connected between lines 18 and 19, which are connected to the secondary winding of a transformer 20. The primary winding of the transformer 20 is connected to the powerlines 11 and 12. The transformer 20 applies 110 volts AC to the lines 18 and 19.

The relay 15 is connected between the lines 18 and 19 through a pair of interlock switches 21 and 22, normally closed contacts 23 of a relay 24 (see FIG. 2), and a manually operable switch 25. Thus, to energize the relay 15 to allow power to be supplied between the lines 16 and 17, it is necessary for the switch 25 to be in its closed position, the normally closed contacts 23 to be closed, and the switches 21 and 22 to be closed.

The power supply also includes a transformer 26 having its secondary winding connected through a full wave rectifier 27 to a pair of lines 28 and 29. This provides a single phase DC power supply of 35 volts between the lines 28 and 29.

The positive line 16 of the 80 volt DC output and the positive line 28 of the 35 volt DC output are connected to a line 30. The line 30 forms the positive line of the detection circuit of the present invention. Thus, the line 17 is at −80 volts, and the line 29 is at −35 volts.

Figure 2:
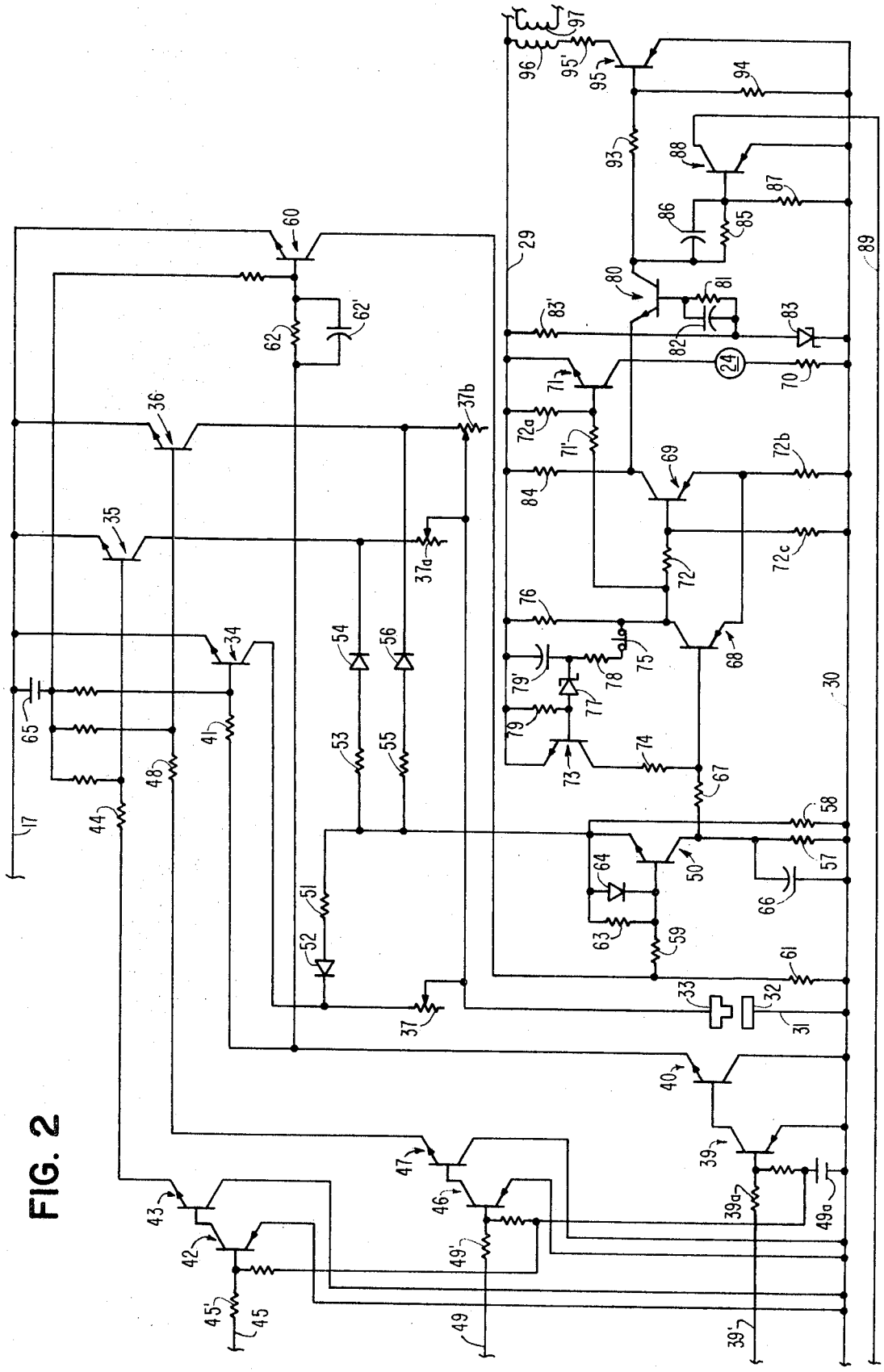
FIG. 2 is a circuit diagram of the detection circuit of the present invention and used with the power supply of FIG. 1.

As shown in FIG. 2, the positive line 30 is connected by a line 31 to a conductive workpiece 32. A tool electrode 33 is spaced from the workpiece 32 to form a spark discharge gap therebetween.

The tool electrode 33 is connected to a plurality of parallel connected NPN transistors 34—36. Each of the transistors 34—36 has its collector connected through variable resistors 37, 37a, and 37b, respectively, to the tool electrode 33. The transistors 34—36 have their emitters connected to the negative lead 17 of the 80 volt DC power supply.

Accordingly, whenever the transistors 34—36 are turned on, a spark occurs across the machining gap between the workpiece 32 and the tool electrode 33 to cause the workpiece 32 to be formed in the shape of the tool electrode. It should be understood that the tool electrode 33 is movable toward and away from the workpiece 32 in the well-known manner for the EDM process.

Figure 3:
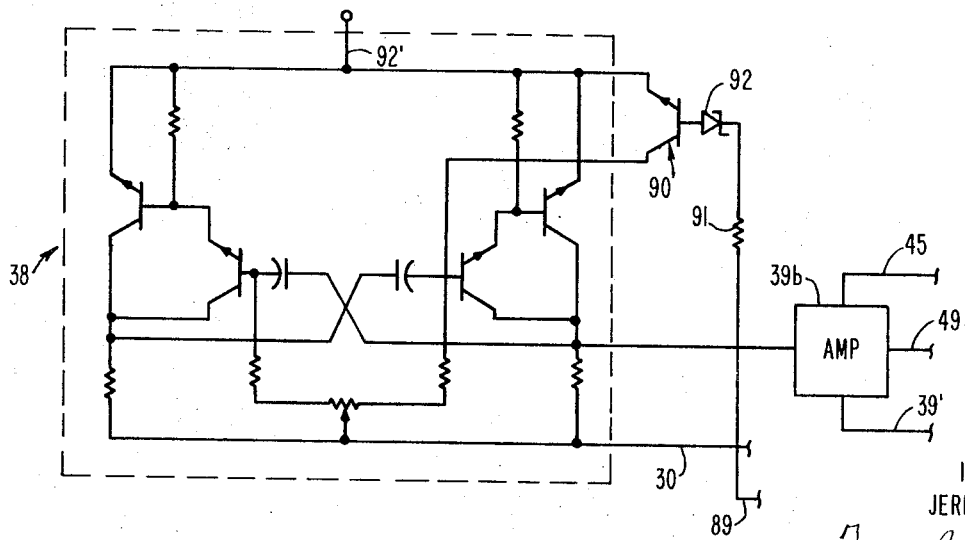
FIG. 3 is a circuit diagram of a control for turning on and off the output transistors of the power supply.

The turning on and off of the transistors 34—36 is regulated by a control 38 (see FIG. 3), which may be a multivibrator, for example. Thus, the frequency with which the transistors 34—36 are turned on and off is determined by the control 38.

The control 38 is connected to each of the transistors 34—36 through a separate driver for each of the transistors 34—36. One suitable form of the driver may be a PNP transistor 39 (see FIG. 2), which has its base connected through a line 39' having a current limiting resistor 39a therein and an amplifier 39b (see FIG. 3) to the output of the control 38, and an NPN transistor 40, which has its base connected to the collector of the transistor 39. The emitter of the transistor 40 is connected through a resistor 41 to the base of the transistor 34. Thus, when the control 38 provides an output signal to the base of the transistor 39 to cause conduction thereof, the transistor 34 is turned on.

The driver for the transistor 35 includes a PNP transistor 42 and an NPN transistor 43 with the emitter of the transistor 43 connected to the base of the transistor 35 through a resistor 44. The base of the transistor 42 also is connected to the control 38 by the amplifier 39b (see FIG. 3), which is connected by a line 45 having current limiting resistor 45' therein to the base of the transistor 42, to receive the output signal therefrom at the same time that the transistor 39 receives the output signal therefrom.

The driver for the transistor 36 includes a PNP transistor 46 and an NPN transistor 47. A resistor 48 connects the emitter of the transistor 47 to the base of the transistor 36. The base of the transistor 46 also is connected to the control 38 by the amplifier 39b (see FIG. 3), which is connected by a line 49 having a current limiting resistor 49' therein to the base of the transistor 46, to be turned on when the transistors 39 and 42 are turned on.

Accordingly, each of the parallel connected transistors 34—36 is turned on at the same time whereby sufficient current flows through the machining gap between the workpiece 32 and the tool electrode 33 to produce a spark discharge thereacross. This causes the machining of the workpiece 32 in the well-known manner.

Each of the driver transistors 39, 42, and 46 is reverse biased from the DC power supply. The secondary winding of the transformer 20 has a circuit similar to that producing the 35 volt DC output to produce a negative bias at 49a. The negative bias 49a is schematically represented by a battery having its negative side connected to the positive line 30. This enables the transistors 39, 42, and 46 to be turned off faster.

The detection circuit of the present invention includes an NPN transistor 50 having its emitter connected in parallel to each of the collectors of the output transistors 34—36. Thus, the emitter of the transistor 50 is connected through a resistor 51 and a diode 52 to the collector of the transistor 34, through a resistor 53 and a diode 54 to the collector of the transistor 35, and through a resistor 55 and a diode 56 to the collector of the transistor 36. The collector of the transistor 50 is connected to the positive line 30 through a resistor 57.

To reduce the voltage on the emitter of the transistor 50, a resistor 58 is connected between the positive line 30 and the emitter of the transistor 50. Accordingly, the resistor 58 serves as a voltage divider with the resistors 51, 53, and 55 to decrease the voltage on the emitter of the transistor 50.

The base of the transistor 50 is connected through a resistor 59 to the collector of an NPN transistor 60, which functions as a reference transistor. The collector of the transistor 60 is connected through a resistor 61 to the positive line 30 while its emitter is connected to the negative line 17.

By having the base of the transistor 60 connected through a resistor 62, which has a capacitor 62' in parallel therewith to increase the switching speed of the transistor 60, to the emitter of the transistor 40, the transistor 60 is turned on whenever the output transistors 34—36 are turned on. Thus, the transistor 60 indicates to the transistor 50 when the control 38 turns the output transistors 34—36 on and off. Due to the connection of the emitter of the transistor 50 to the resistors 51, 53, and 55, the base of the transistor 50 stays negative with respect to the emitter of the transistor 50 as long as there is no short in any of the transistors 34—36 because the transistor 60 turns on when the transistors 34—36 turn on and the transistor 60 turns off when the transistors 34—36 turn off.

A resistor 63 is connected between the emitter and the base of the transistor 50 to insure that the transistor 50 remains off when it is supposed to be off. A diode 64 is connected in parallel with a resistor 63 and serves to prevent the base-emitter voltage from exceeding the breakdown voltage of the transistor 50 by preventing the base of the transistor 50 from ever going too far negative with respect to the emitter.

All of the output transistors 34—36 and the reference transistor 60 are reverse biased from the DC power supply. The secondary winding of the transformer 20 has a circuit similar to that producing the 35 volt DC output to produce a negative bias at 65. The negative bias 65 is schematically represented by a battery having its positive side connected to the negative line 17. This enables the transistors 34—36 and the reference transistor 60 to be turned off faster.

However, if there is a short in one of the transistors 34—36, the base of the transistor 50 becomes positive with respect to its emitter because of the shorted transistor of the transistors 34—36. The shorted transistor causes the emitter of the transistor 50 to increase in the negative direction while the voltage on the base of the transistor 50 drops to 0 volts because the reference transistor 60 is turned off.

Thus, the transistor 50 compares the current flow through each of the output transistors 34—36 with the current flow through the reference transistor 60. If these are not at the same level (i.e., high or low), the transistor 50 conducts because of the voltage difference between its base and emitter.

A capacitor 66 is connected in parallel with the resistor 57. This insures that transients do not develop a voltage across the resistor 57.

When the transistor 50 conducts due to one of the output transistors 34—36 shorting, there is a voltage drop across the resistor 57. This voltage drop is transmitted through a resistor 67 to the base of a PNP transistor 68, which forms part of a Schmitt trigger circuit along with a PNP transistor 69.

When the base of the transistor 68 becomes negative with respect to its emitter, the transistor 68 turns on. When the transistor 68 saturates, the transistor 69 turns off whereby the relay 24 is energized.

The relay 24 is connected to the positive line 30 through a resistor 70 and to the negative line 29 through an NPN transistor 71. Since the NPN transistor 71 has its base connected through a resistor 71' to a point between the collector of the transistor 68 and a resistor 72, which is connected to the base of the transistor 69, the base of the transistor 71 becomes positive with respect to its emitter sufficiently to saturate the transistor 71 whenever the transistor 68 is conducting. Accordingly, when the transistor 68 conducts, the transistor 71 saturates whereby the relay 24 is energized.

It should be understood that the base of the transistor 71 is connected by a resistor 72a to the negative line 29. The resistor 72a insures that the transistor 71 remains in the off state until the transistor 68 conducts.

When the relay 24 is energized, its normally closed contacts 23 (see FIG. 1) open. This deenergizes the relay 15 whereby the contacts 15–1, 15–2, and 15–3 of the relay 15 open to cut off all power to the lines 16 and 17. Thus, when the relay 24 is energized, current is no longer supplied to the output transistors 34—36 whereby the arc across the machining gap is extinguished.

The emitters of the transistors 68 and 69 are connected through a resistor 72b to the positive line 30. The base of the transistor 69 is connected to the positive line 30 through a resistor 72c, which is much larger than either the resistor 72 or 72b. Therefore, the base of the transistor 69 is negative with respect to its emitter to cause it to conduct unless the transistor 68 is turned on.

It should be understood that there is sufficient voltage drop across the resistor 57 to turn on the transistor 68 only when the transistor 50 becomes conductive due to one of the transistors 34—36 being shorted. If there should be any transient current through the transistor 50 or one of the transistors 34—36 is turned on slightly out of phase from the transistor 60, there will not be a sufficient voltage drop across the resistor 57 to turn on the transistor 68 because of the capacitor 66.

When the circuit of the present invention detects that one of the transistors 34—36 is shorted, it is desired to lock the transistor 68 in a conductive state and the transistor 69 in the nonconductive state. The Schmitt trigger is normally not locked in the condition in which the transistor 68 is conducting but merely stays in that condition only as long as there is an input to the transistor 68.

Accordingly, a locking circuit is employed to maintain the transistor 68 in a conductive state even if the signal to the base of the transistor 68 due to the voltage drop across the resistor 57 ceases. The locking circuit includes an NPN transistor 73, which has its collector connected through a resistor 74 to the base of the transistor 68 and its emitter connected to the negative line 29. Once the transistor 73 is turned on, it holds the transistor 68 in its conductive state.

The transistor 68 has its collector connected through a resistor 76 to the negative line 29. When the transistor 68 becomes conductive, a Zener diode 77 breaks down whereby current flows through a pushbutton switch 75, a resistor 78, the Zener diode 77, and a resistor 79. Since the base of the transistor 73 is connected between the resistor 79 and the Zener diode 77, the voltage drop across the resistor 79 causes the base of the transistor 73 to become positive with respect to its emitter whereby the transistor 73 becomes conductive when the transistor 68 is turned on.

Thus, once the transistor 68 becomes conductive, it remains in this condition until the pushbutton switch 75 is moved to an open position. This stops the current flow through the resistor 78 whereby the Zener diode 77 ceases to allow current flow therethrough and the transistor 73 turns off. The switch 75 is only actuated after the output transistor, which has been shorted, has been replaced.

The resistor 78 also is connected to the negative line 29 through a capacitor 79'. The capacitor 79' decreases the speed with which the transistor 73 is turned on.

When the transistor 68 is turned on due to one of the transistors 34—36 shorting whereby the transistor 69 is turned off, an NPN transistor 80 turns on since its base becomes more positive then its emitter, which is connected to the collector of the transistor 69. The base of the transistor 80 is connected through a resistor 81, which has a capacitor 82 in parallel therewith to increase the switching speed of the transistor 80, and a Zener diode 83 to the positive line 30. The Zener diode 83, which is connected to the negative line 29 through a resistor 83', is always broken down so that it provides a constant voltage on the base of the transistor 80 with this voltage being negative with respect to the voltage on the emitter of the transistor 80 when the transistor 69 is conducting.

It should be understood that there is a voltage drop across a resistor 84, which connects the collector of the transistor 69 to the negative line 29, whenever the transistor 69 is conducting. Accordingly, when the potential on the emitter of the transistor 80 becomes more negative due to the transistor 69 ceasing to conduct whereby there is no voltage drop across the resistor 84, the transistor 80 conducts since the potential on its emitter now is negative with respect to its base.

Since the collector of the transistor 80 is connected through a resistor 85, which has a capacitor 86 in parallel therewith, and a resistor 87 to the positive line 30, there is a voltage drop across the resistor 87. The voltage drop across the resistor 87 causes the base of a PNP transistor 88 to become negative with respect to its emitter, which is connected to the positive line 30. As a result, the transistor 88 is turned on; the capacitor 86 causes the transistor 88 to turn on quicker. This allows current to flow from the collector of the transistor 88 through a line 89 to turn off the control 38. When the control 38 is turned off, the output transistors, which are not shorted, receive no current. Thus, no additional arcing occurs due to further pulsing of the output transistors by the control 38.

The line 89 is connected to an NPN transistor 90 (see FIG. 3) through a current limiting resistor 91 for the transistor 90 and a Zener diode 92. When the transistor 88 conducts, a current is supplied to the base of the transistor 90 by the lead 89 to turn on the transistor 90 whereby the control 38 ceases to supply an output to the drivers for the output transistors 34—36. The control 38 and the emitter of the transistor 90 are connected to a negative line 92' of a biasing circuit, which receives its power from the transformer 20 in the same manner as the lines 28 and 29. The control 38 also is connected to the positive line 30, which also is connected to the positive line of the biasing circuit having the negative line 92'. The negative line 92' of this biasing circuit is at −15 volts.

The collector of the transistor 80 also is connected to the positive line 30 by a pair of resistors 93 and 94 (see FIG. 2), which have the base of a PNP transistor 95 connected therebetween. With the emitter of the transistor 95 connected to the positive line 30, the voltage drop across the resistor 94 causes the potential of the base of the transistor 95 to become negative with respect to the emitter whereby the transistor 95 conducts when the transistor 80 is turned on.

When the transistor 95 saturates, current flows through the transistor 95 and a current limiting resistor 95' to the negative line 29 to energize a pulse transformer by flowing through a coil 96. The coil 96 is the primary winding of the pulse transformer having its secondary winding or coil 97 connected in a lead to a gate of a silicon controlled rectifier 98 (see FIG. 1). The silicon controlled rectifier 98 is disposed in a line 99, which extends from the positive line 16 to the negative line 17 to short circuit the 80 volt DC power supply when the silicon controlled rectifier 98 is turned on. Therefore, when the silicon controlled rectifier 98 is turned on due to the coil 96 producing a single pulse at the gate of the silicon controlled rectifier 98 by means of the coil 97, no further power is supplied across the machining gap.

The silicon controlled rectifier 98 can turn on in approximately 4 microseconds while the relay 24 requires about 22,000 microseconds to become effective due to the relay 15 having to be deenergized. Thus, the utilization of the silicon controlled rectifier 98 results in a much faster turning off of the current through the machining gap.

While the silicon controlled rectifier 98 results in a much quicker turning off of the current flow through the machining gap, it should be understood that the present invention will operate satisfactorily without the silicon controlled rectifier 98. While there would be some slight damage to the tool electrode 33 and/or the workpiece 32 due to the longer period of time it takes for the contacts 23 of the relay 24 to open and turn off the 80 volt DC power source by deenergizing the relay 15, this time period for opening the contacts 23 would produce such slight damage to the tool electrode 33 and/or the workpiece 32 that it probably would not be objectionable.

A Zener diode 100 is connected in parallel with the coil 97 of the pulse transformer. This prevents the cathode-gate voltage of the silicon controlled rectifier 98 from exceeding its safe operating voltage.

Considering the operation of the present invention, the 80 volt DC power continuously supplies pulses to the machining gap as long as none of the transistors 34—36 shorts. However, when one of the transistors 34—36 shorts, the transistor 50 conducts due to its emitter becoming negative with respect to its base. This produces a voltage drop across the resistor 57.

When the base of the transistor 68 senses the voltage drop across the transistor 57, the transistor 68 conducts, and the transistor 69 turns off. This causes the turning on of the transistor 71 to energize the relay 24 whereby the normally closed contacts 23 of the relay 24 open. However, because of the relay 24 having to deenergize the relay 15 and the masses of the relays 15 and 14, approximately 22,000 microseconds are required before contacts 15-1, 15-2, and 15-3 open.

When the transistor 68 conducts, the Zener diode 77 breaks down to turn on the transistor 73. When the transistor 73 is saturated, it locks the transistor 68 in the conductive state. This occurs very quickly in comparison with the time that it takes for the contacts 15-1, 15-2, and 15-3 to open.

Thus, the detection circuit remains in the state in which the 80 volt DC power supply is inactivated until the pushbutton switch 75 is opened and then closed. Therefore, there can be no accidental energization of the spark discharge circuit until the shorted transistor is replaced.

When the transistor 68 turns on, the transistor 80 also saturates. This causes the transistor 88 to conduct whereby the control 38 is deactivated. As a result, no additional pulses can be supplied to the drivers to cause the output transistors, which have not been shorted, to be turned on to increase the strength of the arc across the machining gap.

Furthermore, the transistor 95 is turned on when the transistor 80 conducts. This causes the gate of the silicon controlled rectifier 98 to become more positive whereby the silicon controlled rectifier 98 turns on so that the lead 99 serves as a short circuit to turn off the power to the machining gap earlier than is possible with the relay 24.

One example of the various parameters of the circuit of the present invention follows:

Transistors

| | |
|---|---|
| 34, 35, 36 | Westinghouse 1763-1425 |
| 38 | Texas Instrument SP5017 |
| 40 | Westinghouse 1714-1205 |
| 50 | 2N1893 |
| 60 | Westinghouse 1714-1205 |
| 68 and 69 | 2N1305 |
| 71, 73, and 90 | 2N3903 |
| 80 | 2N1304 |
| 88 | 2N3905 |
| 95 | 2N3763 |

Resistors in ohms

| | |
|---|---|
| 37, 37a, and 37b | Variable from 2 to 25 |
| 39a, 45', and 49' | 68 |
| 41, 42, and 43 | 20 |
| 51, 53, and 55 | 2.2K. |
| 57 | 6.8K. |
| 58 | 1.5K. |
| 59 | 6.8K. |
| 61 | 470 |
| 62 | 470 |
| 63 | 3.3K. |
| 67 | 10K. |
| 71' | 15K. |
| 72 | 3.9K. |
| 72a | 2.2K. |
| 72b | 330 |
| 72c | 47K. |
| 74 | 12K. |
| 76 | 820 |
| 78 | 8.2K. |
| 79 | 820 |
| 81 | 1.2K. |
| 84 | 180 |
| 85 | 33K. |
| 87 | 820 |
| 91 | 47K. |
| 93 | 680 |
| 94 | 1K. |
| 95' | 47 |
| Resistor between bias 49a and each of transistors 39, 42, and 46 | 39 |
| Resistor between bias 65 and each of transistors 34—36 | 4 |
| Resistor between bias 65 and transistor 60 | 150 |

Capacitors in picofarads

| | |
|---|---|
| 62' | 150 |
| 66 | 390 |
| 79' | 500 |
| 82 and 86 | 50 |

Diodes

| | |
|---|---|
| 52, 54, and 56 | Westinghouse 388C |

An advantage of this invention is that it reduces the damage to the tool and the workpiece. Another advantage of this invention is that it shuts down the power supply to the machining gap of an EDM apparatus rapidly.

For purposes of exemplification, a particular embodiment of the invention has been shown and described according to the best present understanding thereof. However, it will be apparent that changes and modifications in the arrangement and construction of the parts thereof may be resorted to without departing from the spirit and scope of the invention.

I claim:

1. A power supply for an electrical machining apparatus that removes material from a conductive workpiece by spark discharges across a machining gap between the workpiece and a tool electrode, said power supply including:
   a power source;
   at least one transistor between one side of the gap and one side of said power source;
   means to control the turning on and off of said transistor to control the spark discharges across the gap;
   means to sense when said transistor shorts and in a time period less than that in which said control means would again turn on said transistor;
   means to stop supply of current to said transistor after said sensing means senses that said transistor has shorted; and
   said stopping means including first means to inactivate said control means before said control means would again turn on said transistor while said power source remains activated and connected to said transistor.

2. The power supply according to claim 1 in which said stopping means includes means, separate from said first means, to inactivate said power source.

3. The power supply according to claim 2 in which said stopping means also includes means to short circuit said power source in a much shorter period of time than said inactivating means inactivates said power source to prevent said power source from supplying current to the shorted transistor, said short circuit means being separate from said first means and said inactivating means.

4. A power supply for an electrical machining apparatus that removes material from a conductive workpiece by spark discharges across a machining gap between the workpiece and a tool electrode, said power supply including:
- a power source;
- a plurality of parallel connected transistors disposed between one side of the gap and one side of said power source;
- means to control the turning on and off of all of said transistors to control the spark discharges across the gap;
- means to sense when one of said transistors shorts;
- means to stop supply of current to said shorted transistor when said sensing means senses that said transistor has shorted; and
- said stopping means includes first means to inactivate said control means before said control means would again turn on said transistors while said power source remains activated and connected to said transistors to stop turning on of said transistors that have not been shorted when one of said transistors is shorted.

5. The power supply according to claim 4 in which said stopping means includes second means, separate from said first means, to inactivate said power source.

6. The power supply according to claim 4 in which said stopping means includes means, separate from said first means, to short circuit said power source to prevent said power source from supplying current to the shorted transistor.

7. The power supply according to claim 5 in which said stopping means also includes means to short circuit said power source in a much smaller period of time than said second inactivating means inactivates said power source to prevent said power source from supplying current to the shorted transistor, said short circuit means being separate from said first means and said second inactivating means.

8. A method of detecting when there is a short in one of a plurality of output transistors of a power supply for an electrical machining apparatus that removes material from a conductive workpiece by spark discharges across a machining gap between the workpiece and a tool electrode wherein a control turns the plurality of output transistors on and off to produce the spark discharges, said method comprising:
- sensing when any one of the plurality of output transistors shorts; and
- stopping supply of current to the remainder of the output transistors by deenergizing the control that turns the transistors on and off before the control would again turn on the transistors to produce a spark discharge across the gap while a power source remains activated and connected to the transistors.

9. The method according to claim 8 including inactivating the power source after the control has been deenergized.

10. The method according to claim 9 including shorting the power source before it is inactivated but after the control has been deenergized.